Oct. 29, 1968  J. T. HIGGINS  3,407,785

APPARATUS FOR SPRAYING SOLID PARTICLES

Filed May 9, 1966  3 Sheets-Sheet 1

FIG. 1

INVENTOR.
JOHN T. HIGGINS

Arne J. Fors
Agent

Oct. 29, 1968    J. T. HIGGINS    3,407,785
APPARATUS FOR SPRAYING SOLID PARTICLES
Filed May 9, 1966    3 Sheets-Sheet 2

INVENTOR.
JOHN T. HIGGINS
BY
Arne T. Fors
Agent

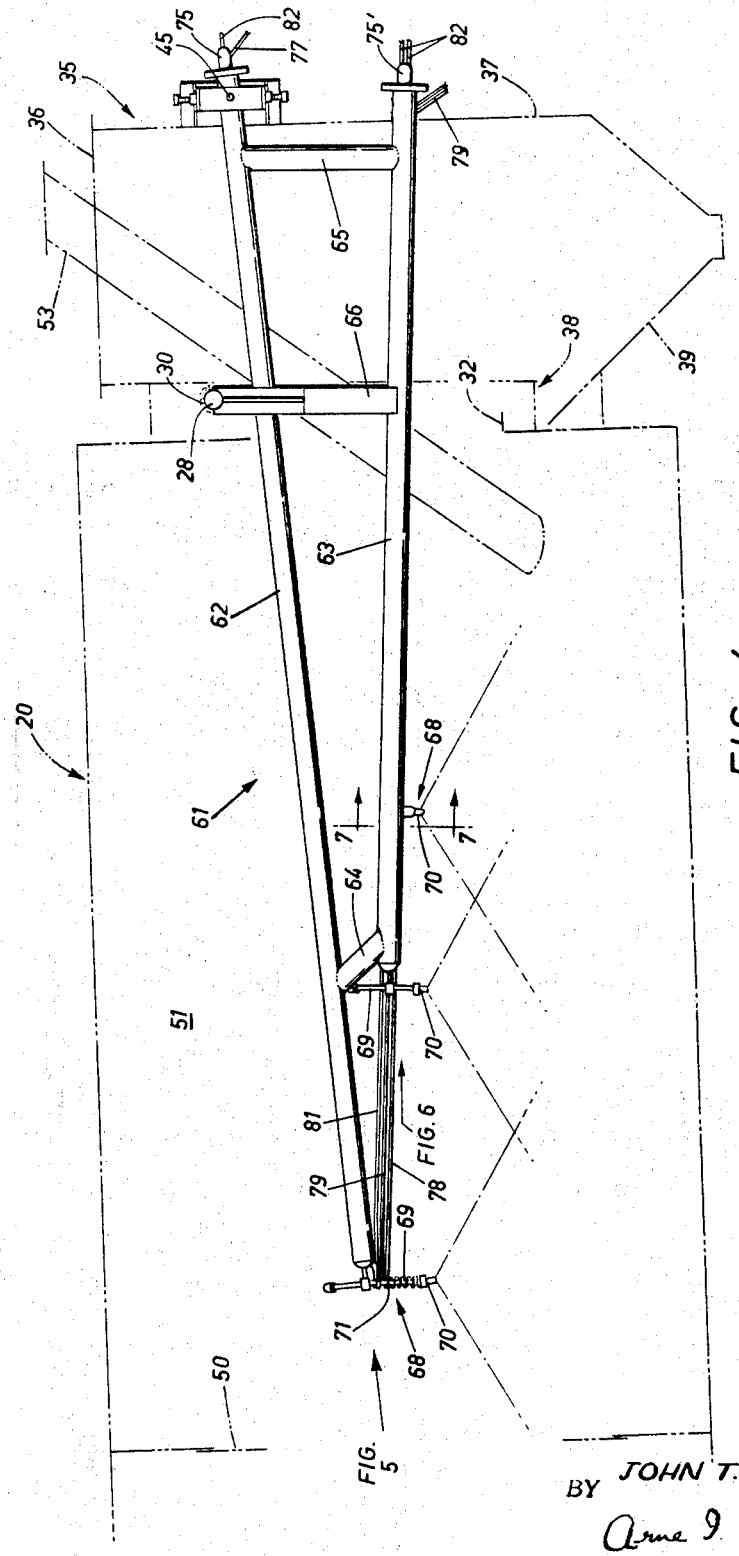

United States Patent Office 3,407,785
Patented Oct. 29, 1968

3,407,785
APPARATUS FOR SPRAYING SOLID PARTICLES
John T. Higgins, Trail, British Columbia, Canada, assignor to Cominco Ltd., a corporation of Canada
Filed May 9, 1966, Ser. No. 548,662
2 Claims. (Cl. 118—302)

ABSTRACT OF THE DISCLOSURE

A spraying apparatus cantilevered into cylindrical rotating granulating drum having adjustable support means external to the drum for vertical adjustment of spray heads carried by the assembly, conduit means communicating the spray heads with a source of a nitrogenous compound in melt form, and temperature control means for maintaining the melt temperature within close limits.

---

This invention relates to an apparatus for spraying liquid compound and in particular is directed to a spraying apparatus adapted for use in the production of granular fertilizers from nitrogenous compounds such as ammonium nitrate and urea by spraying molten compound from a plurality of spray heads onto solid particles within a rotating drum and solidfying the melt by cooling the particles in a current of cool air passing through the drum, as described in U.S. Patent No. 3,232,703 issued Feb. 1, 1966.

One process with which the improved spraying apparatus is utilized comprises the steps of forming a bed of continuously moving, solid particles or nuclei of fertilizer compound in the granulating zone of the rotating drum; advancing the particles through the granulating zone; spraying a molten, substantially anhydrous melt of the nitrogenous compound at a temperature of 5 to 25 centrigrade degrees above its crystallization temperature onto the bed and into a continuously cascading curtain of solid particles in the granulating zone; simultaneouly contacting the curtain of solid particles with a current of cooling air flowing countercurrent to the direction of the advance of the particles; continuously passing solid particles from the granulating zone to the cooling zone of the rotating drum and continuously passing cooling air from the cooling zone to the granulating zone; passing solid particles through the cooling zone countercurrent to a stream of cooling air flowing through said cooling zone; withdrawing cooled, solid particles from the cooling zone; separating and collecting particles of the desired size from the withdrawn particles; and recycling undersize and crushed oversize particles to the granulating zone.

The granules produced by this process have a number of desirable characteristics; in particular, the granules are harder, stronger, larger and more uniformly sized than the conventional prilled material. Test work has shown that ammonium nitrate granules produced by this process have a crushing strength in excess of 2,500 grams whereas on the same relative scale the crushing strength of prills is only about 1,000 grams.

In order to satisfactorily spray liquid urea or nitrogenous compound such as ammonium nitrate over solid particles or grains within the granulating zone of a rotating drum, it is necessary to maintain the temperature and distribution of the spray within very close limits, avoid local hot or cold spots in the deposition zone, and closely control the rate of spray deposition.

In operation, solid particles are introduced into the granulating zone of the drum and rotation of the drum, which is equipped with lifters, produces a cascade or curtain of the particles within the drum, while the lower part of the drum contains a bed of particles at a sustained bed line or level. If the spray density is too great, the grains become wetted and agglomerate, while if the density is too low the spray "freezes" before coating the particle, and undesired quantities of fines are produced that recirculate through the system, thus reducing the efficiency of the process. Control of the process to provide optimum production of the desired granules in an efficient fashion is obtained by the avoidance of hot or cold spots in the spray pattern, and by closely controlling the position of the spray heads in relation to the established bed line.

Owing to the inevitable build-up of agglomerate on portions of the apparatus, which becomes loosened and is circulated by the drum to fall upon portions of the spraying apparatus, it is necessary to protect the spray apparatus from such bombardment, which otherwise results in damage and misadjustment.

In addition, it is desirable to provide reinforced supports to the nozzle spray heads to provide desired stiffness under impact loads.

The invention thus provides a method of spraying a liquid nitrogenous compound onto a bed and a continuously cascading curtain of solid particles within the granulating zone of a rotating drum wherein the liquid compound is introduced within the granulating zone to be sprayed over the particles from a plurality of spray heads suspended within said drum, the improvement comprising the step of selectively adjusting the height of the spray heads relative to the bed whereby the slope of the spraying apparatus and the spraying deposition over the granulating particles may be controlled.

Thus, there is provided spraying apparatus for use within a rotating drum mounted for rotation about a substantially horizontal axis, to spray a liquid compound within the drum, comprising: conduit means cantilevered to extend within the drum; at least one pipe within the conduit means to conduct the compound in liquid form to the drum interior; spray head means connected with the pipe to spray the compound within the drum; heating means within the conduit in heating relation with the pipe, to maintain the compound in liquid form prior to spraying from the head means; suspension means independent of the drum supporting the conduit to extend within the drum; and means for adjusting the suspension means to control the slope of the spraying apparatus relative to the drum.

Certain embodiments of apparatus according to the present invention are hereafter described with reference to the accompanying drawings, wherein:

FIGURE 1 shows a cross sectional elevation of a first embodiment of the spray apparatus as installed in a rotating drum;

FIGURE 4 shows details of a second embodiment of the spray apparatus;

Like reference characters refer to like parts throughout the description of the drawings.

Figure 2:
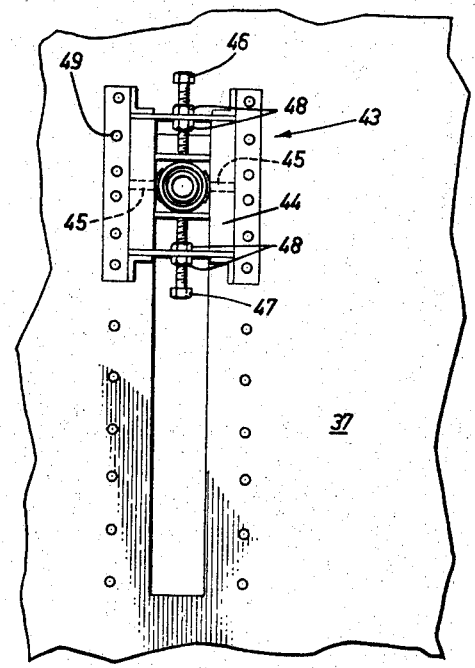
FIGURE 2 shows the spraying apparatus slope adjusting means as seen on the line 2—2 of FIGURE 1.
Figure 3:
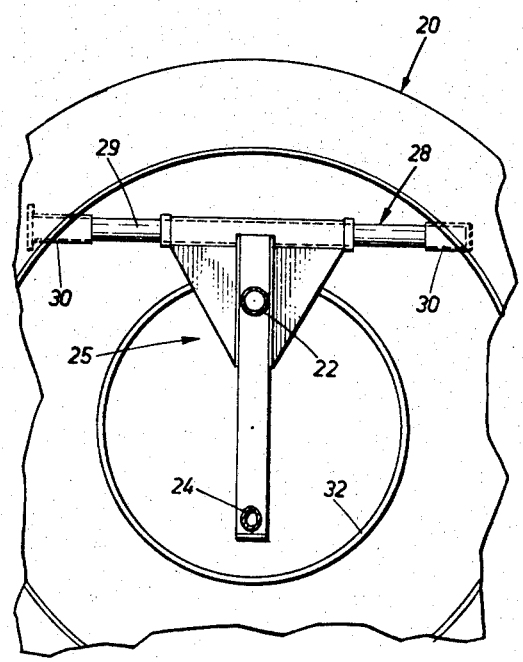
FIGURE 3 is an end section of the apparatus taken on the line 3—3 of FIGURE 1.

Referring to the drawings, FIGURE 1 shows a rotary drum 20 having cantilevered spray conduit means 21 extending therein. The spray conduit means comprises a main tube 22 having a pair of bracing tubes 23, 24 connected with a support frame 25 supported by a pivot 28. Referring to FIGURE 3, the pivot 28 comprises a transverse bar 29, mounted in support sleeves 30 shown attached to a fixed portion of the hopper. This arrangement permits ready dismounting and withdrawal of the spray apparatus from the drum for servicing purposes.

The drum 20, which is slightly inclined from the horizontal, has a breech portion 32 at its upper end leading to a hopper 35. The hopper 35 comprises a roof portion 36, an outer wall 37, and an inner wall 38 together with a lower funnel portion 39.

The slope of the cantilevered spray conduit 21 within the drum 20 is controlled by means of slope adjusting device 43 which comprises a gimbal frame 44 having gimbal frame pivots 45 secured to the spray conduit 21 at the outer end thereof. The vertical position of the gimbal frame 44 and hence the slope of the spray apparatus is controlled by means of a top actuator cap screw 46 and a bottom actuator cap screw 47, these cap screws having lock nuts 48 thereon, being secured to the fixed structure of the hopper by means of a bracket 49.

The drum 20 includes provision for cooling air means at its lower end (not shown) and contains a retaining ring 50 which defines the granulating zone 51. The granulating particles are introduced into the granulating zone by means of a make-up pipe 53 which extends from the hopper through the breech 32 of the drum into the drum granulating zone.

The heated liquid compound is sprayed within the granulating zone by means of spray heads 55 each having a compound supply pipe 56 leading from an internal supply pipe 58 extending from conduit 22 for communication with source means to a nozzle 57, the supply pipes 56 being surrounded within conduit 22 by a heater jacket tube extending through the spray conduit as will be described with reference to the embodiment of the invention disclosed in FIGURES 4 through 7. The construction and function of the cantilevered spray conduit 21 is similar to that of the second embodiment illustrated generally in FIGURE 4 also described hereinbelow in more detail.

Figure 5:
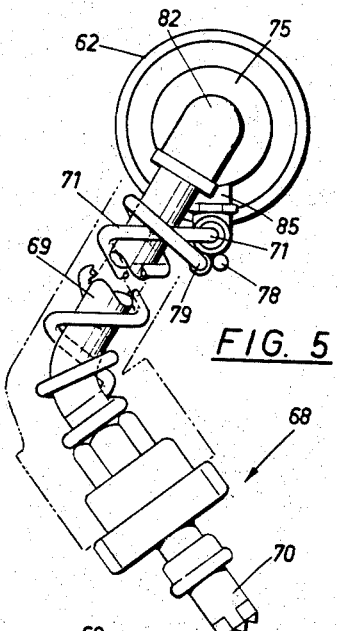
FIGURE 5 is a view taken in the direction of the arrow 5 of FIGURE 4.
Figure 6:
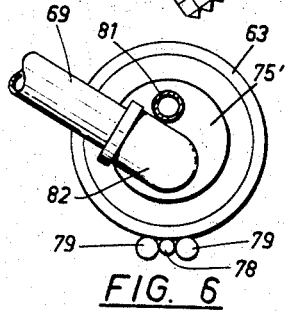
FIGURE 6 is a view taken in the direction of arrow 6 of FIGURE 4.
Figure 7:
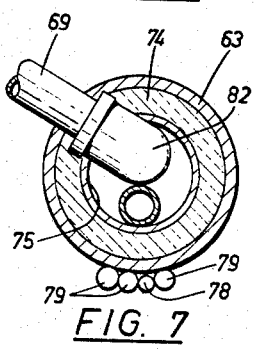
FIGURE 7 is a section on the line 7—7 of FIGURE 4.

Referring to FIGURE 4, the braced conduit 61 comprises an upper main tube 62, a lower main tube 63, the tubes being secured together in vertical relation by means of an inner brace 64, an outer brace 65 and a support frame 66 from which the braced conduit is suspended by means of a transverse pivotal suspension similar to that shown in FIGURE 3. The plurality of spray heads 68 each comprises a compound supply pipe 69 together with a spray nozzle 70, a heater pipe 71 being coiled about each compound supply pipe 69 in order to prevent freezing of the compound within the supply pipe. FIGURES 5, 6 and 7 clearly illustrate the way in which the conduit main tubes 62, 63 are lined with insulation 74 maintained in place by inner jacket tubes 75, 75'.

A plurality of pipes 82 extending from conduit tubes 62, 63 for communication with compound source means connects with the spray heads, each spray head being generally serviced by an individual supply or process line contained within the inner jacket tubes 75, 75'. Steam heat is provided by a supply of steam passing within the inner jacket tubes 75, 75'; the steam being introduced to the upper jacket tube 75 by external pipe 77, from jacket tube 75 to jacket tube 75' through line 81, and returning by way of condensate return lines 79 to a trap (not shown). Each coiled heater pipe 71 is connected at one end to jacket tubes 75, 75' by a nipple 85 for a supply of steam under pressure and at the other end to an independent condensate return line 79, as illustrated most clearly in FIGURE 5; the individual condensate lines being collected together under conduit tube 63 and extending the length thereof to the external trap. In order to ensure that the condensate does not accumulate, it is generally necessary to arrange that main tube 22 and lower main tube 63 of conduits 21, 61 respectively, slope upwardly into the drum so that the condensate return lines slope downwardly from the drum, thereby promoting free flow of condensate from the lines to the trap.

The spray heads 55, 68 may be inclined to one side of the drum in the direction of rotation, pointing downwardly so as to spray the compound onto the bed and into the cascading curtain of particles in the drum.

While not illustrated, it is generally found practicable to supply additional braces from the cantilevered conduit structures to the spray heads, in order that the position of the heads shall be maintained as invariable as possible. Where threaded pipe structures are employed under the adverse operating conditions, there is a danger that, without such braces, the threaded components may loosen, permitting rotation of the pipes into an undesired position.

The steam heating of the compound within the supply pipes and nozzles is maintained constant by means of a thermo-couple or thermo-couples 78 for controlling the supply of steam.

The use of the present apparatus for spraying a slurry into the drum is also contemplated.

The present invention provides a number of important advantages. Close control of the temperature of the molten compound and its rate of discharge can be maintained while insulation of the pipes permits stable thermal conditions to be established in the critical spray zone. The height of the spray heads relative to the bed of solid particles can be readily externally adjusted to control the slope of the spray apparatus within the drum. The header can be readily withdrawn for maintenance if required.

In operating a spraying apparatus of this type it is important to ensure low heat loss from the spray header in order to prevent heat loss and to prevent too high a temperature in the granulating zone, which would disrupt spray solidification rates. The present invention makes possible the provision of spray headers that can be extended inwardly fifteen feet or more into a drum.

It will be understood, of course, that improvements can be made in the process and apparatus of the present invention described hereinabove without departing from the scope and purview of the appended claims.

What I claim as new and desire to protect by Letters Patent of the United States is:

1. Spraying apparatus for use in combination with a cylindrical rotary cooling drum having a granulating zone, and a hopper located at one end thereof, comprising: conduit means extending through said hopper and cantilevered to extend partially within said drum; pivotal support means secured to said hopper in supporting relation with said conduit means, said conduit means having a plurality of members including an elongated tube member in mutual bracing relation to minimize vertical distortion of the tube member, a second conterminous elongated tube extending coaxially within said first tube; heat insulation means inserted therebetween; first and second pipes within said second tube, said first pipe extending for a portion of the length of said tubes and connecting with a spray head within said drum, said second pipe extending within said drum beyond said first and second tubes and having a spray head connected thereto; fluid heating means within said second tube extending therefrom in heating relation with said spray heads, drain means to remove condensed heating fluid from said apparatus; and vertical adjustment means outside said hopper remote from said drum in controlling contact with said conduit means, whereby vertical adjustment of said adjustment means in a first vertical sense produces related movement of said spray heads within said drum in the opposite vertical sense for control of the slope of said spraying apparatus.

2. Spraying apparatus as claimed in claim 1 wherein said vertical adjustment means includes a gimbal frame pivotally secured to the outer end of said conduit means for movement about a horizontal axis extending normal to said conduit means; and selectively controllable actuator means for vertically positioning said frame relative to a fixed support, whereby the elevation of the inner end of said conduit means within said drum is selectively controlled.

(References on following page)

References Cited

UNITED STATES PATENTS

| | | | |
|---|---|---|---|
| 1,865,436 | 7/1932 | Ferguson | 118—318 X |
| 1,969,283 | 8/1934 | Talbot | 259—168 X |
| 2,424,202 | 7/1947 | Woolery | 118—305 |
| 2,601,355 | 6/1952 | Wiss et al. | 118—303 X |
| 2,665,944 | 1/1954 | Lansing et al. | 239—139 |
| 2,816,846 | 12/1957 | Talmey | 118—409 X |
| 3,101,040 | 8/1963 | Lanz | 118—303 X |

CHARLES A. WILLMUTH, *Primary Examiner.*

JOHN P. McINTOSH, *Assistant Examiner.*